US007765037B2

(12) United States Patent
Bagge et al.

(10) Patent No.: US 7,765,037 B2
(45) Date of Patent: Jul. 27, 2010

(54) RUNWAY INCURSION DETECTION SYSTEM AND METHOD FOR DISPLAYING A RUNWAY INCURSION

(75) Inventors: Charles J. Bagge, Cedar Rapids, IA (US); Donald J. Whalen, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1221 days.

(21) Appl. No.: 11/207,281

(22) Filed: Aug. 19, 2005

(65) Prior Publication Data

US 2007/0043483 A1 Feb. 22, 2007

(51) Int. Cl.
*G05D 1/02* (2006.01)

(52) U.S. Cl. ............................ 701/16; 345/7; 382/103; 244/75.1; 342/26 R; 342/195; 340/961; 340/972; 340/995.2; 340/995.27

(58) Field of Classification Search .................. 701/16; 340/972, 995.2, 995.27
See application file for complete search history.

(56) References Cited

U.S. PATENT DOCUMENTS 5,629,691 A 5/1997 Jain
6,199,008 B1 * 3/2001 Aratow et al. ............... 701/120
6,486,825 B1 11/2002 Smithey
6,606,563 B2 8/2003 Corcoran, III
7,414,545 B2 * 8/2008 Vickas ........................ 340/953
7,502,685 B2 * 3/2009 Nakamura .................. 701/211
2003/0135327 A1 * 7/2003 Levine et al. ............... 701/220
2004/0095259 A1 5/2004 Watson
2005/0192738 A1 * 9/2005 Conner et al. ............... 701/120
2005/0283305 A1 * 12/2005 Clark et al. ................. 701/120
2006/0265109 A1 * 11/2006 Canu-Chiesa et al. .......... 701/3
2007/0010921 A1 * 1/2007 Ishihara et al. ................ 701/16

* cited by examiner

*Primary Examiner*—Tuan C To
(74) *Attorney, Agent, or Firm*—Matthew J. Evans; Daniel M. Barbieri

(57) ABSTRACT

A method for displaying a runway incursion for an aircraft includes electronically gathering traffic information data from a traffic information system, employing a runway incursion algorithm to the traffic information data to detect a collision hazard, automatically calculating incursion data, and displaying the incursion data. A runway incursion detection system has a display unit, a computer and a software product that enables methodology herein.

7 Claims, 7 Drawing Sheets

RUNWAY INCURSION DETECTION SYSTEM AND METHOD FOR DISPLAYING A RUNWAY INCURSION

BACKGROUND

As known to those skilled in the art, Runway Incursion Algorithms detect collision hazards while aircraft are on the ground. These Runway Incursion Algorithms generally operate using information from a Traffic Information System ("TIS"). A TIS supplies information regarding other aircraft in a vicinity, among other things, and is known in the art. Typically, when a Runway Incursion Algorithm detects a collision hazard, a pilot must quickly assess the hazard, select the target, turn on a velocity vector, and adjust the velocity vector using a rotary knob for the desired time. This procedure is neither an efficient use of time nor invulnerable to human error.

SUMMARY

Systems and methods herein provide for the identification and display of a runway incursion for use in an aircraft. A method of one embodiment includes the steps of gathering traffic information data from a traffic information system ("TIS"), employing a runway incursion algorithm to the traffic information data to detect a collision hazard, automatically calculating incursion data, and displaying the incursion data. The method may heighten a pilot's awareness of a pending runway incursion while reducing the pilot's workload and opportunities for human error.

In an embodiment, a runway incursion detection system for an aircraft is provided, including a display unit, a computer and a software product. The software product has instructions, stored on computer-readable media, wherein the instructions, when executed by the computer, perform steps for evaluating a runway incursion and displaying the runway incursion on the display unit. The instructions include instructions for gathering traffic information data from a traffic information system; instructions for employing a runway incursion algorithm to said traffic information data for detecting a collision hazard; instructions for automatically calculating incursion data, and instructions for displaying said incursion data on said display unit.

DETAILED DESCRIPTION

Figure 1:
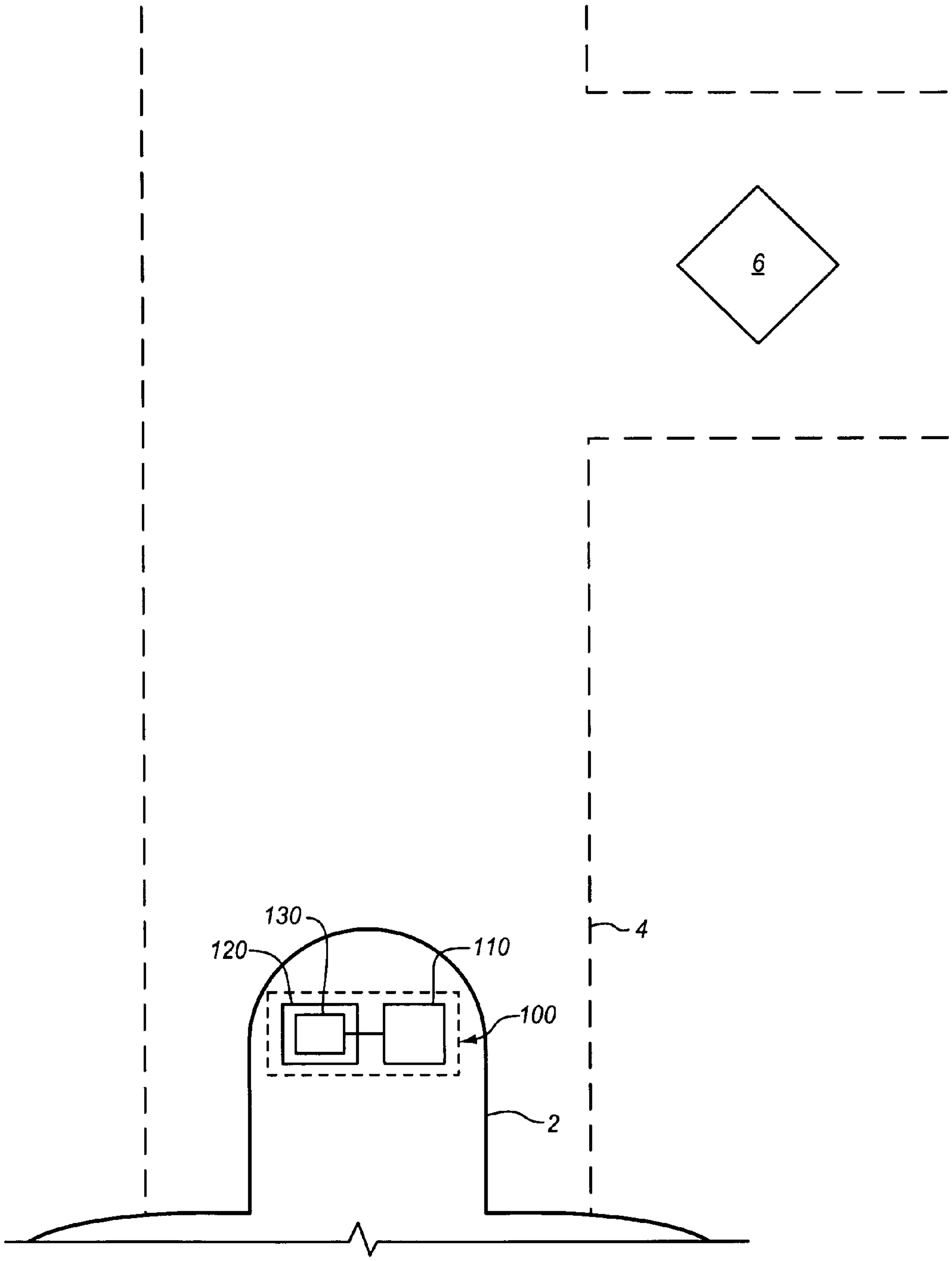
FIG. 1 illustrates one runway incursion detection system in accord with an embodiment.

FIG. 1 shows an aircraft 2 on a runway 4. A runway incursion detection system 100 aboard the aircraft 2 includes a display unit 110, a computer 120, and a software product 130. In operation, runway incursion detection system 100 identifies and displays a collision hazard 6 (e.g., another aircraft), to reduce a pilot's workload and opportunities for human error.

Figure 2:
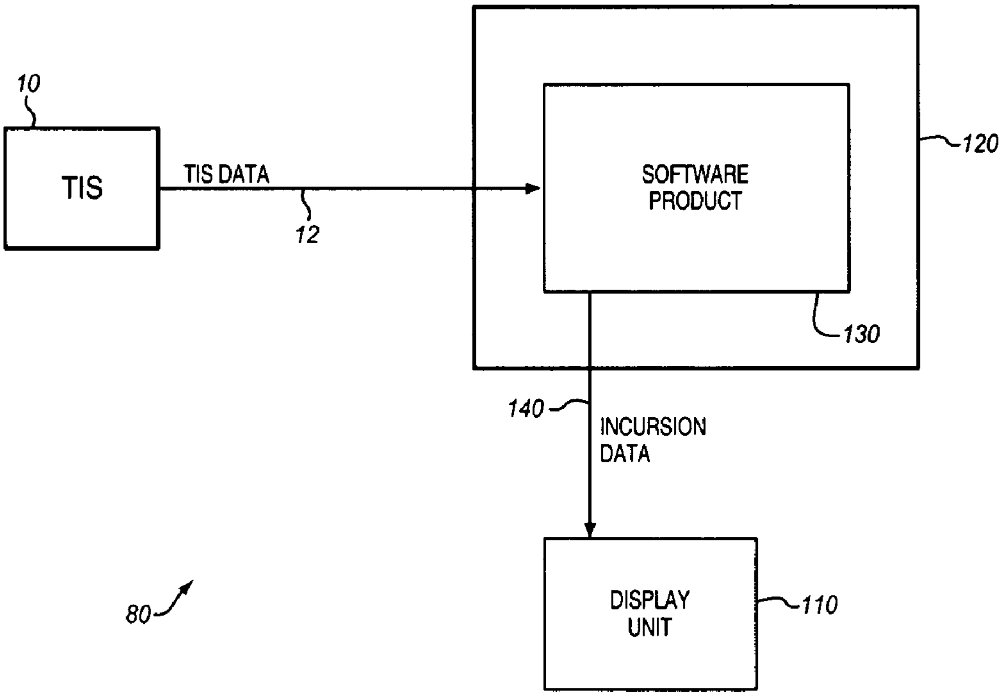
FIG. 2 shows a block diagram of the runway incursion detection system of FIG. 1.
Figure 3:
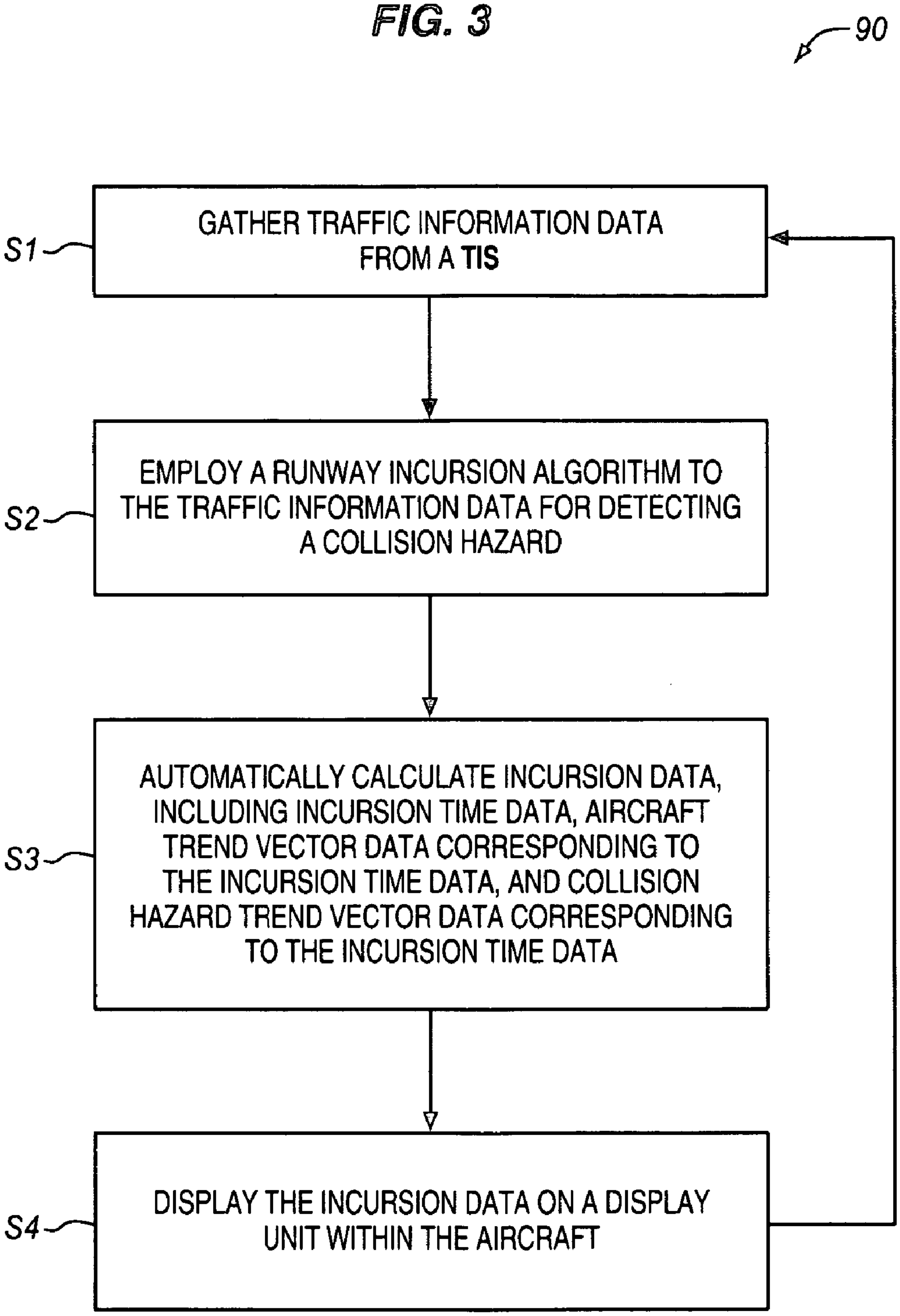
FIG. 3 shows a flow chart illustrating a process for displaying a runway incursion, according to an embodiment.

FIG. 2 shows a block diagram 80 of runway incursion detection system 100 of FIG. 1; and FIG. 3 shows a flow chart illustrating a process for displaying a runway incursion. FIG. 2 and FIG. 3 are best viewed together in the following description. In particular, FIG. 2 illustrates computer 120 executing software product 130. Software product 130 has instructions stored on computer-readable media (e.g., software instructions in random access memory (RAM), program instructions on CD or DVD, or read-only memory (ROM), for example) that evaluate and display a runway incursion when executed by computer 120. Steps taken by computer 120 in executing software product 130 are thus illustratively shown as process 90 in FIG. 3.

At step S1, software product 130 gathers traffic information data 12 from a traffic information system ("TIS") 10, known in the art. Process 90 then continues to step S2.

Figure 5:
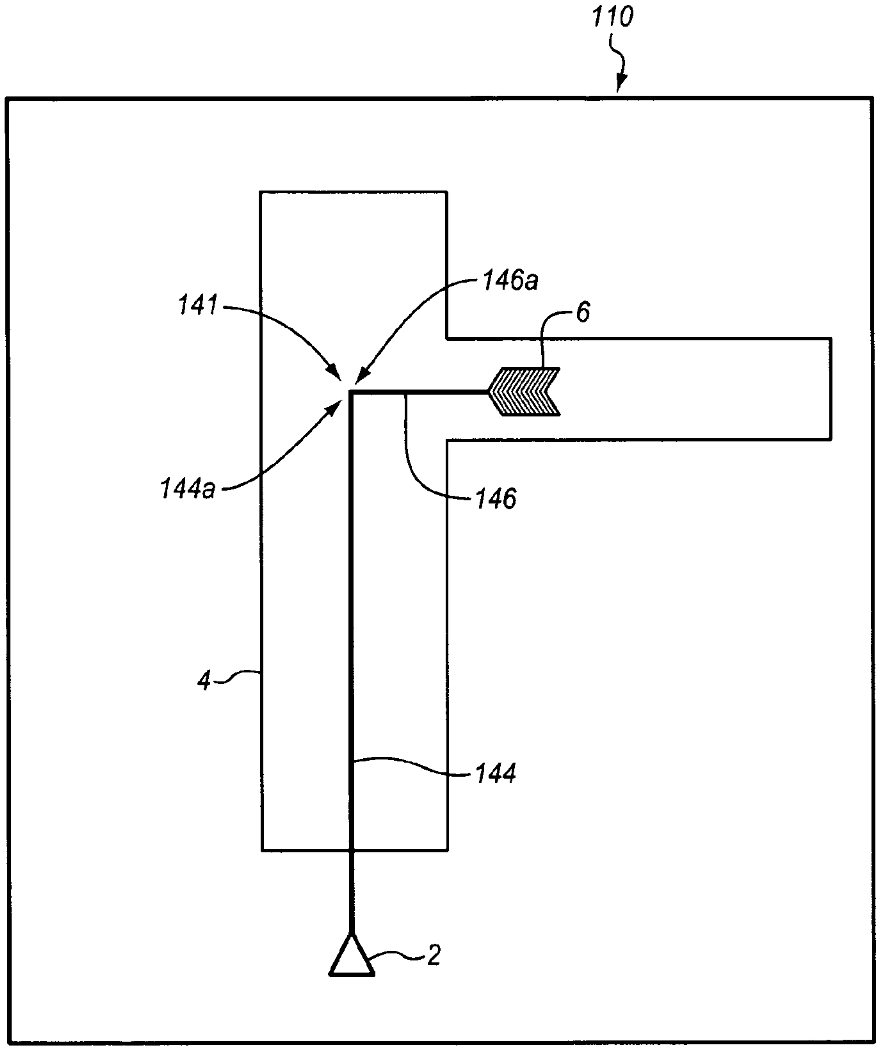
FIG. 5 shows an exemplary display of runway incursion, according to an embodiment.
Figure 6:
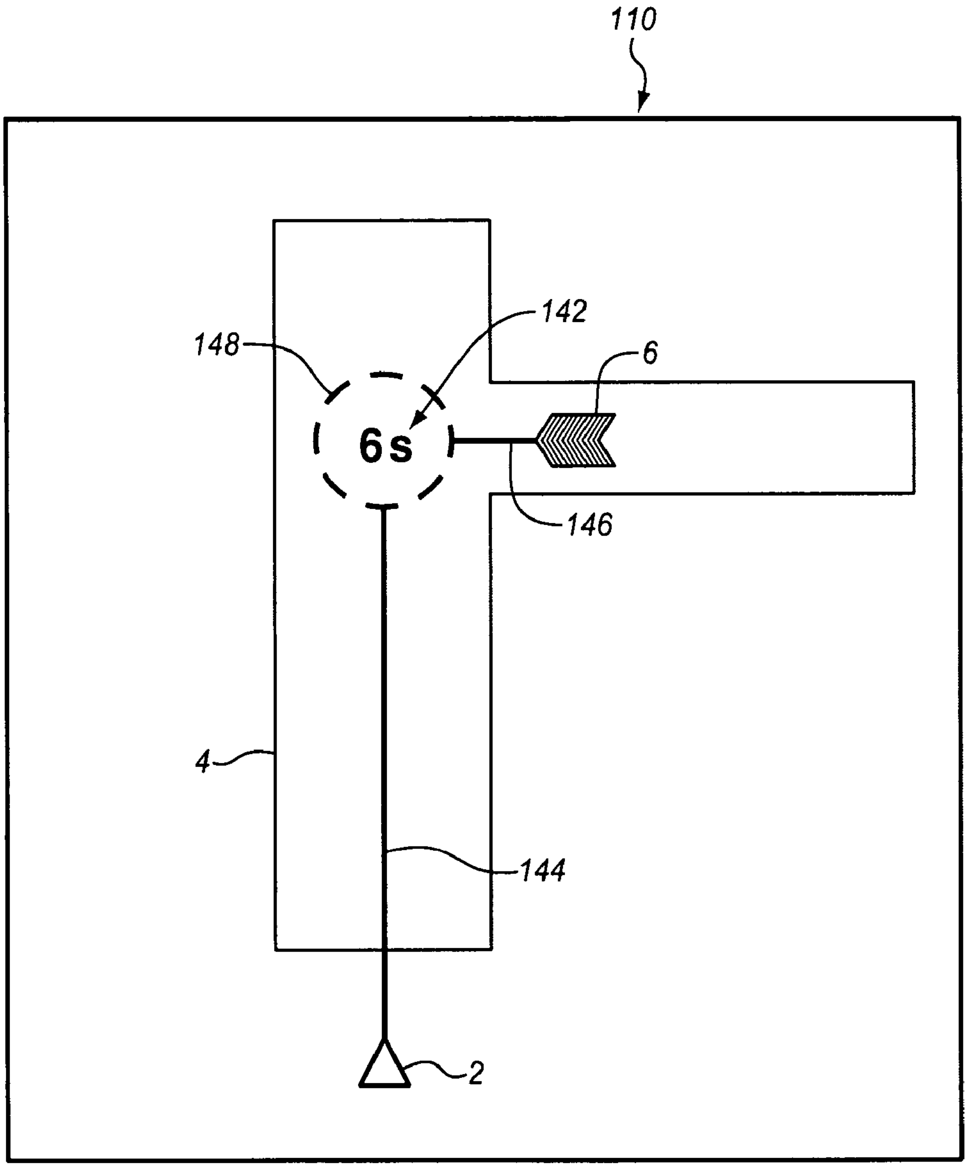
FIG. 6 shows an exemplary display of runway incursion, according to an embodiment.
Figure 7:
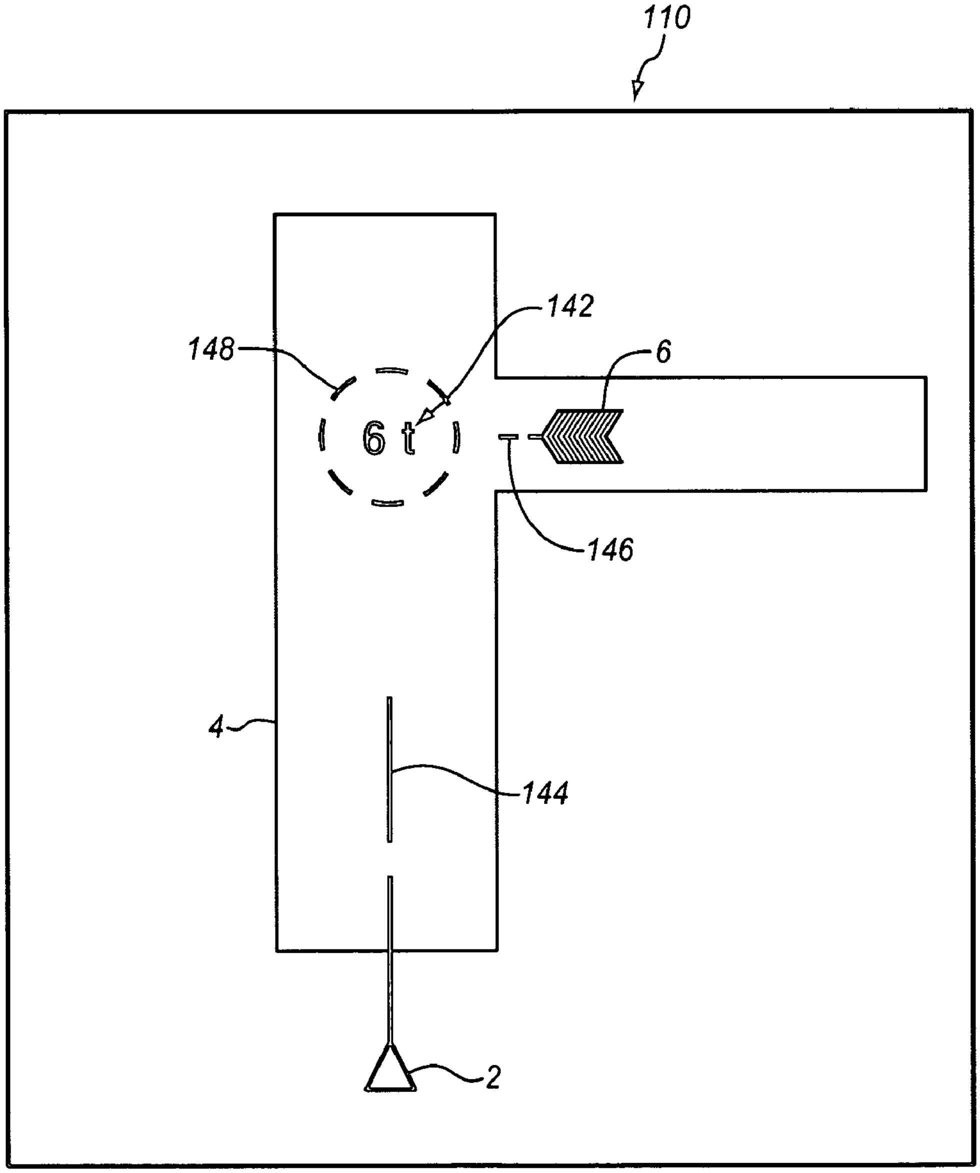
FIG. 7 illustrates the display of FIG. 6 with an animated aircraft trend vector and an animated collision hazard trend vector.

At step S2, software product 130 employs a runway incursion algorithm, also known in the art, to traffic information data 12 to detect a collision hazard (see, e.g., collision hazard 6 of FIG. 5, FIG. 6 and FIG. 7). Process 90 then continues to step S3.

Figure 4:
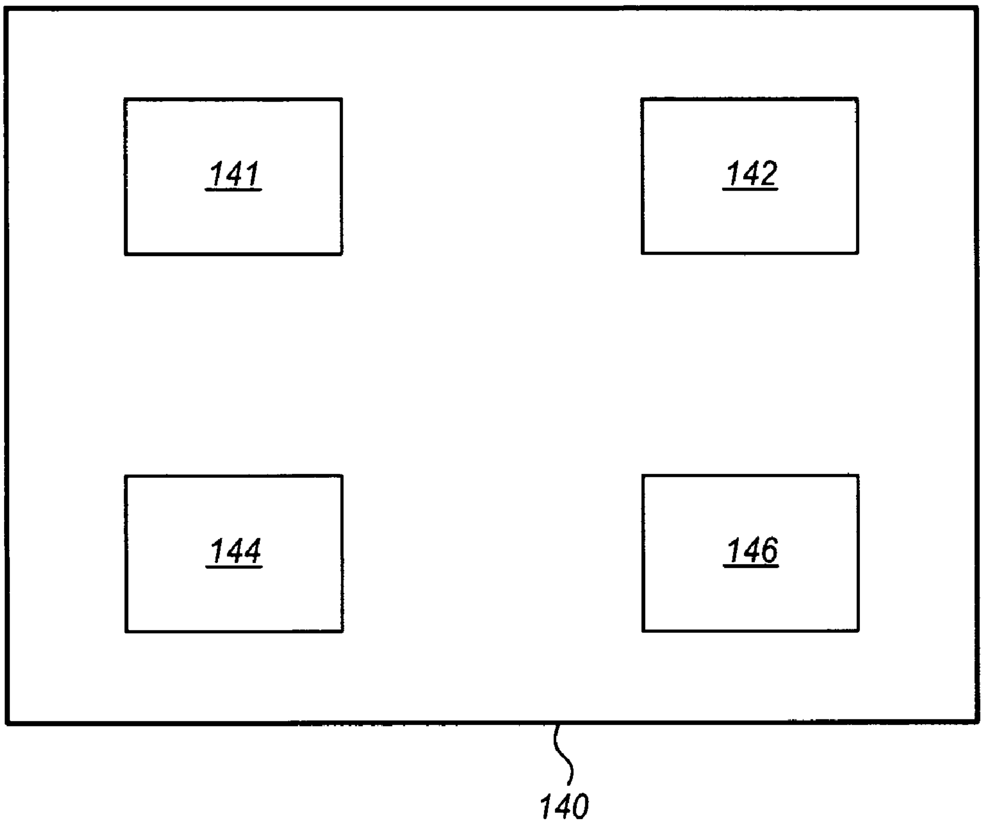
FIG. 4 shows a block diagram of exemplary incursion data.

At step S3, software product 130 automatically calculates incursion data 140, illustratively shown in FIG. 4. Incursion data 140 includes an incursion point 141, an incursion time 142, an aircraft trend vector 144, and a collision hazard trend vector 146. Incursion point 141 is a predicted location of incursion 6. Incursion time 142 is the amount of time until aircraft 2 reaches incursion point 141. Aircraft trend vector data 144 predicts position and path of aircraft 2 up to incursion point 141, at incursion time 142. Collision hazard trend vector 146 predicts position and path of collision hazard 6 up to incursion point 141, at incursion time 142.

Computer 120 and software product 130 may determine incursion data 140 based upon data from TIS 10, including for example aircraft position, aircraft velocity, aircraft heading, collision hazard position, collision hazard velocity and collision hazard heading. Process 90 then continues with step S4.

At step S4, software product 130 displays incursion data 140 on display unit 110, such as described below. Process 90 may then repeat steps S1-S4, as shown.

FIG. 5 shows an example display of incursion data 140 on display unit 110. In the illustrated embodiment of FIG. 5, display unit 110 displays aircraft trend vector 144 and collision hazard trend vector 146. An endpoint **144*a* of aircraft trend vector 144 is displayed to intersect with an endpoint 146*a* of collision hazard trend vector 146 at incursion point 141**. This provides the pilot with a user-friendly display that he may quickly and easily monitor.

FIG. 6 shows one exemplary display of incursion data 140 on display unit 110. A graphic 148 is shown encircling incursion point 141 (shown in FIG. 5), and incursion time 142 is displayed inside graphic 148. While aircraft trend vector 144 and collision hazard trend vector 146 may be arranged as in FIG. 5, aircraft trend vector 144 and collision hazard trend vector 146 are shown truncated, in FIG. 6, at graphic 148.

Graphic 148 is shown in FIG. 6 as a circle. However, it should be apparent that graphic 148 may comprise other shapes such as rectangles and triangles; the size of the graphic 148 may also be selected appropriately. For example, in one embodiment, the size (e.g., diameter) of graphic 148 is based on a size of aircraft 2 and a size of the collision hazard 6; or the size of graphic 148 may be based on an amount of uncertainty of incursion data 140.

FIG. 7 shows one exemplary display of incursion data 140 on display unit 110. As in FIG. 6, graphic 148 encircles incursion point 141 (see e.g., FIG. 5) and incursion time 142 is displayed inside of graphic 148. While aircraft trend vector 144 and collision hazard trend vector 146 may be arranged as in FIG. 5, aircraft trend vector 144 is animated to appear as if it is traveling from aircraft 2 to graphic 148; and collision hazard trend vector 146 is also animated to appear as if it is traveling from collision hazard 6 to graphic 148. These animations draw pilot attention to display unit 110, to reinforce severity of an emerging situation. In an embodiment, animation of aircraft trend vector 144 and/or hazard trend vector 146 comprise moving dashed lines, pulsing graphics, temporally changing colors, etc.

Those skilled in the art appreciate that variations from the specified embodiments disclosed above are contemplated herein. The description should not be restricted to the above embodiments, but should be measured by the following claims.

What is claimed is:

1. A method for displaying a runway incursion for an aircraft, comprising:

electronically gathering traffic information data from a traffic information system;

employing a runway incursion algorithm to said traffic information data to detect a collision hazard;

automatically calculating incursion data, wherein said incursion data comprises data representative of:

an incursion point, an incursion time, an aircraft trend vector, and a collision hazard trend vector; and displaying said incursion point, said incursion time, said aircraft trend vector, and said collision hazard vector on a display unit, where said incursion point is depicted as a graphic, said incursion time is depicted within said graphic, and said aircraft trend vector and said collision hazard trend vector have different appearances.

2. The method as in claim 1, wherein:

said aircraft trend vector is truncated at said graphic; and said collision hazard trend vector is truncated at said graphic.

3. The method as in claim 1, wherein the appearance of said aircraft trend vector is animated, of said collision hazard trend vector is animated, or both are animated.

4. The method as in claim 1, wherein said incursion data is based on:

aircraft position;

aircraft velocity;

aircraft heading;

collision hazard position;

collision hazard velocity; and collision hazard heading.

5. The method of claim 4, wherein said traffic information data provides data representative of:

said hazard position;

said collision hazard velocity; and said collision hazard heading.

6. A runway incursion detection system for an aircraft, comprising:

a display unit;

a computer; and a software product comprising instructions, stored on a computer-readable media, wherein said instructions, when executed by said computer, perform steps for evaluating a runway incursion and displaying the runway incursion on said display unit, said instructions comprising instructions for:

gathering traffic information data from a traffic information system;

employing a runway incursion algorithm to said traffic information data to detect a collision hazard;

automatically calculating incursion data, wherein said incursion data comprises data representative of:

an incursion point, an incursion time, an aircraft trend vector, and a collision hazard trend vector; and said incursion point, said incursion time, said aircraft trend vector, and said collision hazard trend vector on said display unit, where said incursion point is depicted as a graphic, said incursion time is depicted within said graphic, and said aircraft trend vector and said collision hazard trend vector have different appearances.

7. The system as in claim 6, wherein said instructions for displaying said aircraft trend vector and said collision hazard trend vector comprise instructions for:

animating the appearance of said aircraft trend vector;

animating the appearance of said collision hazard trend vector; or animating the appearance of both.

* * * * *